US008754951B2

United States Patent
Hirayama

(10) Patent No.: US 8,754,951 B2
(45) Date of Patent: *Jun. 17, 2014

(54) CONTROL CIRCUIT FOR IMAGE-CAPTURING DEVICE

(75) Inventor: Hideki Hirayama, Gifu-ken (JP)

(73) Assignee: Semiconductor Components Industries, LLC., Phoenix, AZ (US)

( * ) Notice: Subject to any disclaimer, the term of this patent is extended or adjusted under 35 U.S.C. 154(b) by 607 days.

This patent is subject to a terminal disclaimer.

(21) Appl. No.: 13/106,117

(22) Filed: May 12, 2011

(65) Prior Publication Data

US 2011/0279692 A1 Nov. 17, 2011

(30) Foreign Application Priority Data

May 17, 2010 (JP) .................................. 2010-112878

(51) Int. Cl.
*H04N 5/228* (2006.01)

(52) U.S. Cl.
USPC ................... 348/208.2; 348/208.4; 348/208.5

(58) Field of Classification Search
None
See application file for complete search history.

(56) References Cited

U.S. PATENT DOCUMENTS

| 7,856,179 B2* | 12/2010 | Hirayama ...................... 396/55 |
| 2009/0160960 A1* | 6/2009 | Nagata et al. ............ 348/208.99 |
| 2009/0195547 A1* | 8/2009 | Abe .............................. 345/501 |
| 2013/0300915 A1* | 11/2013 | Okamoto et al. ............. 348/345 |

FOREIGN PATENT DOCUMENTS

JP 2002-246913 A 8/2002

* cited by examiner

*Primary Examiner* — Lin Ye
*Assistant Examiner* — Euel Cowan
(74) *Attorney, Agent, or Firm* — Rennie William Dover

(57) ABSTRACT

Performing data processing more effectively for camera shake correction is desirable. Movement of an image-capturing device is compensated on the basis of displacement velocity of the image-capturing device detected by a displacement velocity detector and position regarding a focus adjustment member of the image-capturing device detected by a position detector. An input data format converter converts the displacement velocity detected at the displacement velocity detector from fixed-point format to floating-point format and converts the detected position of the focus member to floating-point data. Furthermore, a gyro filter uses data processing in floating-point format to calculate displacement data for a required amount the image-capturing device is to be displaced and a Hall filter uses data processing in floating-point format to generate drive data for the focus adjustment member. Then, the drive data in floating-point format from the Hall filter is converted to drive data in fixed-point format.

7 Claims, 5 Drawing Sheets

CONTROL CIRCUIT FOR IMAGE-CAPTURING DEVICE

CROSS-REFERENCE TO RELATED APPLICATIONS

The entire disclosure of Japanese Patent Application No. 2010-112878 filed on May 17, 2010, including specification, claims, drawings, and abstract, is incorporated herein by reference in its entirety.

BACKGROUND

1. Technical Field

The present invention relates to a control circuit for an image-capturing device for calculating drive data for a focus adjustment member to compensate for movement of the image-capturing device on the basis of displacement velocity of the image-capturing device detected by a displacement velocity detector and position regarding the focus adjustment member of the image-capturing device detected by a position detector.

2. Background Art

Image-capturing devices, such as digital cameras or cameras mounted in cellular telephones, are increasingly equipped with a camera shake correction function to prevent a reduction in image quality due to camera shake. Various types of camera shake correction methods exist. In one method, an optical part, such as a correction lens or the like forming a focusing mechanism for image capture, or an image-capturing element, such as a CCD image sensor or the like, is displaced on the basis of vibration (angular velocity of the optical axis of the focusing mechanism) of the image-capturing device detected by a gyro sensor or the like. For position control of the focusing mechanism, it is necessary to detect the position of the member to be displaced, and for this position detection a Hall sensor or the like is employed.

To displace the correction lens or the like, an integration process of an angular velocity signal output from a gyro sensor is performed and conversion from angular velocity to an amount of displacement corresponding to angle is performed. This signal processing utilizes common digital data processing and the processing, such as integration, is performed after digital data conversion by an A/D converter (ADC: Analog-to-Digital Converter) of the signal from the sensor. Furthermore, to obtain a signal for controlling the actual drive of the correction lens or the like, a position detection signal from a Hall sensor is also necessary and the output of the Hall sensor is also subjected to A/D conversion, and then processed as digital data.

Then, drive data for the correction lens or the like obtained in this manner is converted to an analog signal by a D/A converter (DAC: Digital-to-Analog Converter) and supplied to an actuator for driving the correction lens. Furthermore, when the actuator is to be controlled using pulse-width modulation (PWM), digital data is supplied to a PWM modulation circuit and the actuator is controlled using PWM by this PWM circuit.

SUMMARY OF THE INVENTION

Here, the A/D converter, the D/A converter, the PWM circuit and so forth have simple configurations and are normally used to input fixed-point format data. Therefore, digital data processing necessary for camera shake correction is also performed by data processing in normal fixed-point format.

Furthermore, the processing for the output from the gyro sensor includes an integration process, and calculations in fixed-point format easily cause overflow in the integration process. Accordingly, it is preferable to perform data processing more effectively for camera shake correction.

Processing by converting fixed-point data to floating-point data is disclosed, for example, in Japanese Patent Laid-Open Publication No. 2002-246913.

Movement of an image-capturing device is compensated on the basis of the displacement velocity of the image-capturing device detected by a displacement velocity detector and the position regarding a focus adjustment member of the image-capturing device detected by a position detector. An input data format converter converts the displacement velocity detected in a displacement velocity detector (gyro sensor) from fixed-point format to floating-point format and also converts the detected position of the focus member to floating-point data. Furthermore, a gyro filter calculates a displacement for an amount the image-capturing device is to be displaced by data processing in floating-point format and a Hall filter generates drive data for the focus adjustment member by data processing in floating-point format. Then, the drive data in floating-point format from the Hall filter is converted to drive data in fixed-point format.

According to the present invention, data processing can be effectively performed for camera shake compensation by performing data processing utilizing data in floating-point format.

DETAILED DESCRIPTION

An embodiment of the present invention will be described hereinafter with reference to the attached drawings. The control device of the image-capturing device relating to the embodiment is used in a camera shake correction function.

Figure 1:
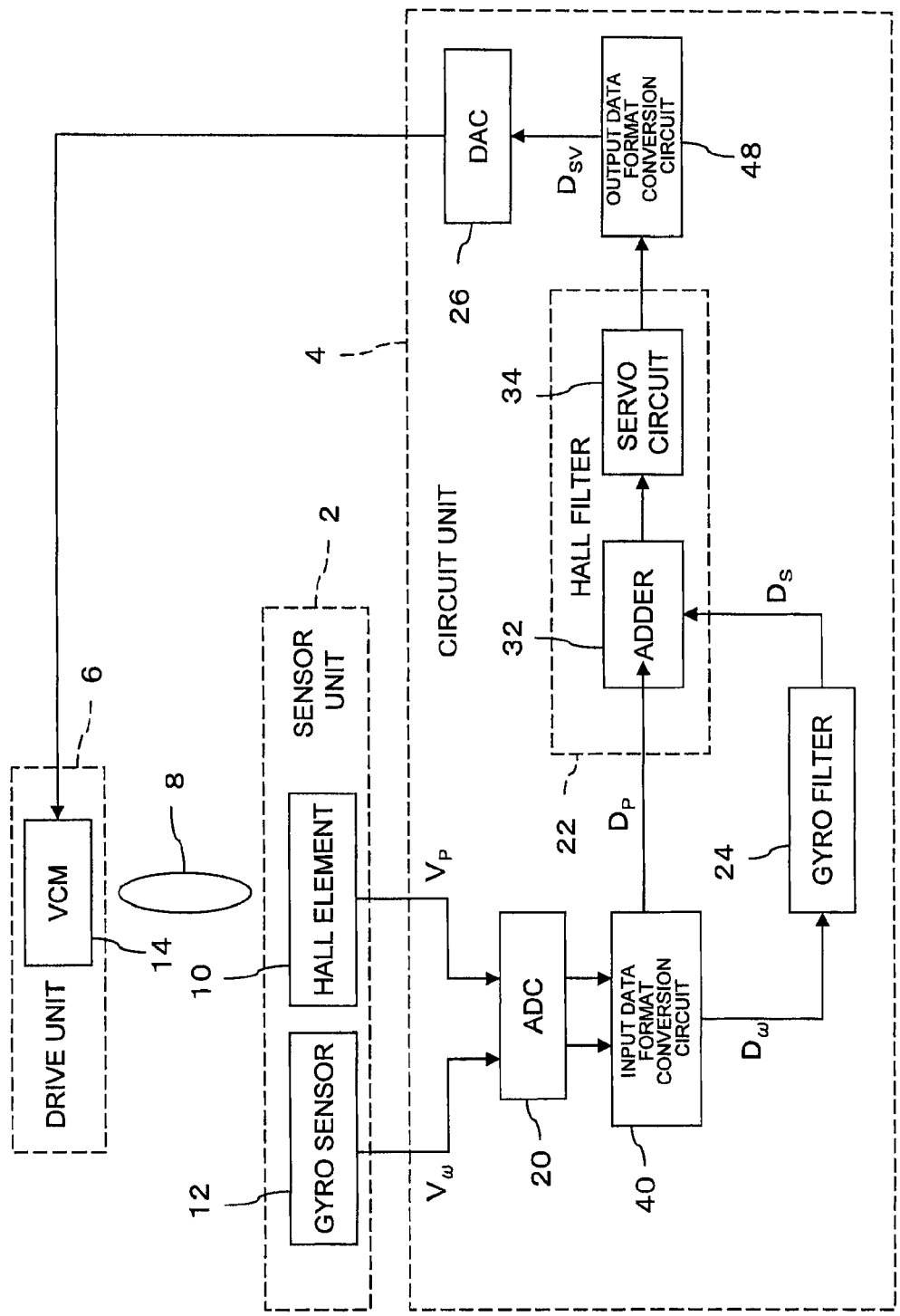
FIG. 1 is a schematic block diagram of a camera shake correction system relating to the embodiment.

FIG. 1 is a schematic block diagram of a camera shake correction system relating to the embodiment. The camera shake correction system has a sensor unit 2, a circuit unit 4, and a drive unit 6. The system adopts a method for camera shake correction by adjusting the position of a correction lens (lens 8), which is provided in an optical system forming an optical image on a light receiving surface of an image-capturing element (not shown) and used as a focus adjustment member.

The sensor unit 2 is composed of Hall elements 10 and gyro sensors 12. The Hall element 10 is a sensor for detecting the position of the lens 8 and generates and outputs a voltage signal VP to the circuit unit 4 in accordance with distance from the lens 8 on the basis of a magnetic field of a magnet fixed to the lens 8. To detect a 2-dimensional position (PX, PY) of the lens 8 within a plane (x-y plane) perpendicular to the optical axis, the Hall element 10 is provided to respectively correspond to the x direction and the y direction, and output the signal VP respectively for the x direction and the y direction.

The gyro sensor 12 is a sensor (displacement velocity detector) provided for detecting vibration of the camera and outputs to the circuit unit 4 a voltage signal Vω corresponding to an angular velocity ω as a vibration detection signal corresponding to the displacement velocity of the camera. Two gyro sensors 12 are also provided and respectively output the signal Vω for the angular velocity component around the x axis and the angular velocity component around the y axis.

The displaceable lens 8 and the drive unit 6 for displacing the lens 8 form a vibration compensating mechanism. The drive unit 6 is, for example, formed from a voice coil motor (VCM) 14. The VCM 14 controls the position of the lens 8 by linearly displacing the position of a moving coil forming the VCM in accordance with a drive signal generated by the circuit unit 4. To realize 2-dimensional displacement within the x-y plane, a pair of moving coils is provided, each respectively for displacement in the x direction and in the y direction.

The circuit unit 4 has an ADC (A/D converter) 20, a Hall filter 22, a gyro filter 24, and a DAC 26. The circuit unit 4 is configured from logic circuits and is configured, for example, as an ASIC (Application Specific Integrated Circuit).

The ADC 20 inputs the output signals VP and Vω from the Hall elements 10 and the gyro sensors 12, respectively. Using time division, the ADC 20 converts the voltage signals VP respectively output from the two Hall elements 10 and the voltage signals Vω respectively output from the two gyro sensors 12 into fixed-point format position data DP and angular velocity data Dω. The A/D conversion of the signals is performed periodically at every servo control period.

The position data DP and the angular velocity data Dω, which are output by the ADC 20, are input by an input data format conversion circuit 40. The input data format conversion circuit 40 converts the position data DP and the angular velocity data Dω from fixed-point format to floating-point format. The input data format conversion circuit 40 converts 16-bit fixed-point format data to 32-bit floating-point format data. It should be noted the processing of the input data format conversion circuit 40 is performed using time division in synchronization with output from the ADC 20.

The position data DP in floating-point format generated on the basis of the outputs of the Hall elements 10 is input by the Hall filter 22. On the other hand, the floating-point format angular velocity data Dω generated on the basis of the outputs of the gyro sensors 12 is input by the gyro filter 24.

The gyro filter 24 is a circuit for generating vibration compensating data in accordance with an amount of displacement of the camera. The gyro filter 24 integrates the angular velocity Dω to be input spanning a predetermined sampling period at every servo control period and generates data Dθ in accordance with vibration angle θ of the camera around the x axis and the y axis. The gyro filter 24 generates and outputs vibration compensating data DS in accordance with the vibration amount respectively corresponding to the x axis and the y axis on the basis of the data Dθ. The vibration compensating data DS represents data (displacement data for the image-capturing device) relating to how much the lens 8 is to be displaced in both the x axis and the y axis directions.

The Hall filter 22 has an adder 32 and a servo circuit 34. The adder 32 adds position data DP input by the input data format conversion circuit 40 and vibration compensating data DS from the gyro filter 24 separately in the x and y directions. From the output data of the adder 32, the servo circuit 34 calculates servo data DSV that corresponds to a predetermined displacement indicating the required displacement of the lens 8 from the current position in both the x-axis direction and the y-axis direction.

The obtained servo data DSV is input by an output data format conversion circuit 48, where it is converted from floating-point format to fixed-point format, and the servo data DSV in fixed-point format is supplied to the DAC 26.

It should be noted the output data format conversion circuit 48 may be provided between the adder 32 and the servo circuit 34 so that the input data to the servo circuit 34 is converted into fixed-point format and then subjected to data processing in fixed-point format at the servo circuit 34 wherefrom servo data DSV in fixed-point format is output.

The DAC 26 converts servo data DSV that is output from the Hall filter 22 into an analog voltage signal. The voltage signal output by the DAC 26 is subjected to predetermined amplification processing and applied to the VCM 14. The VCM 14 is driven in a direction where the absolute value of DSV decreases. Thus, a camera mounted with this system can obtain a high quality image signal by moving the lens 8 in accordance with camera shake in the image capturing period to compensate for displacement of the subject image on the image-capturing element due to camera shake.

Figure 2:
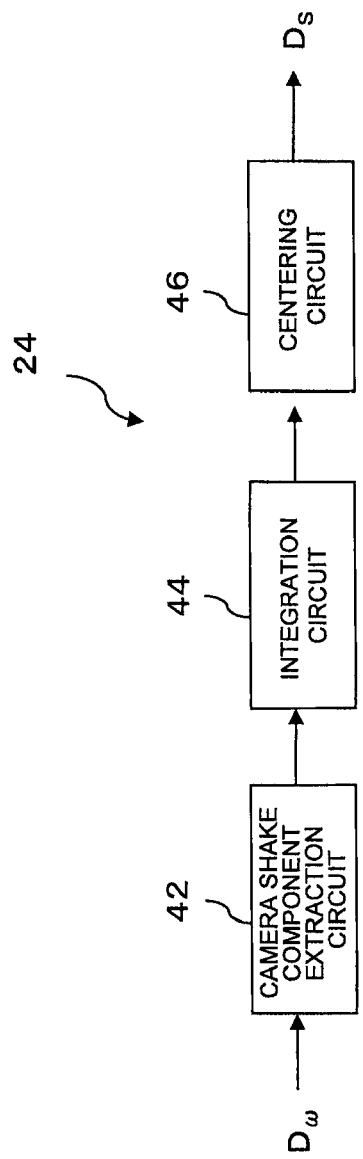
FIG. 2 is a block diagram showing a schematic configuration of a gyro filter relating to the embodiment.

Next, the configuration of the gyro filter 24 will be described. FIG. 2 is a block diagram showing the schematic configuration of the gyro filter 24. The gyro filter 24 has a camera shake component extraction circuit 42, an integration circuit 44, and a centering circuit 46.

The camera shake component extraction circuit 42 is a high-pass filter (HPF) and inputs the time-sequenced angular velocity data Dω, attenuates the low-frequency component included therein, and extracts a vibration component of a target compensation region. The target compensation region is set to 1 Hz or higher to correspond to the fact that camera shake includes, for example, the low frequencies of approximately 2-10 Hz. Namely, the camera shake component extraction circuit 42 attenuates the low-frequency component substantially regarded as a direct current component and passes through components of approximately several Hz. The camera shake component extraction circuit 42 is composed of a digital filter for performing calculations in floating-point format and set with filter characteristics according to a filter coefficient set in a register (not shown).

The integration circuit 44 integrates angular velocity data in floating-point format output by the camera shake component extraction circuit 42 and generates angular data Dθ representing the amount of displacement of the image-capturing device. The integration circuit 44 can be configured using an LPF and set with filter characteristics according to a filter coefficient set in a register (not shown). It should be noted the angular data Dθ generated at the integration circuit 44 represents the amount of displacement of the image-capturing device as described hereinabove and can be used as vibration compensating data DS to the Hall filter 22. However, in the present system, a centering process is further performed with respect to the angular data Dθ obtained at the integration circuit 44 and the result thereof is supplied to the Hall filter 22 as vibration compensating data DS.

The centering circuit 46 performs a process for correcting the amount of displacement so that the lens 8 does not easily reach a movable limit due to a compensation control mechanism. From the angular data Dθ obtained from the integration process, the centering circuit 46 attenuates a component regarded as direct current having a frequency lower than the lower limit of the target compensation region. In this case, the centering circuit 46 can be configured using an HPF. The HPF for centering is configured from a digital filter performing calculations in floating-point format and set with filter characteristics according to a filter coefficient set in a register (not shown). Similar to the HPF forming the abovementioned camera shake component extraction circuit 42, the cutoff frequency for the HPF forming the centering circuit 46 is basically set lower than the lower limit of the target compensation region. As described hereinabove, the processed result of the centering circuit 46 becomes the vibration compensating data DS.

Here, in the embodiment, the gyro sensor 12 detects the signal Vω for angular velocity around the x axis and around the y axis. Then, the gyro filter 24 calculates the vibration compensating data DS, which is the amount of movement in the x axis and y axis directions, on the basis of the angular data Dθ in the x axis and y axis directions calculated from the signal Vω so that an image position is compensated for by movement of the lens 8 in the x axis and y axis directions. The form of compensation is not limited in this manner and the lens 8 can also be moved in another direction.

The vibration compensating data DS in floating-point format output from the centering circuit 46 is input by the adder 32 in the Hall filter 22.

In the processing of the gyro filter 24, data can be generated in a range that cannot be expressed in fixed-point format. For example, the accumulation of direct current components in the integration circuit 44 can cause the integration results to reach a value exceeding an upper limit that can be expressed as 16-bit fixed-point format data. The direct current components are removed by the centering circuit 46 and the processed results of the centering circuit 46 can have a range that can be expressed in fixed-point format although the accuracy of the vibration compensating data DS output from the centering circuit 46 decreases when overflow occurs at the integration circuit 44. However, since the gyro filter 24 of the system performs a process to generate the vibration compensating data DS from the angular velocity data Dω on the basis of data expressed in floating-point format, data that cannot be expressed in fixed-point format can also be expressed correctly and on the basis of the correct value thereof highly accurate vibration compensating data DS can be obtained.

Furthermore, the gyro filter 24 has a configuration where a digital filter performs a process to generate the vibration compensating data DS from the angular velocity data Dω. This configuration makes it possible to reduce circuit area compared to a configuration in which is provided a microprocessor or the like. As a result, it becomes possible to reduce the cost of the semiconductor chip forming the circuit unit 4. Furthermore, when the abovementioned floating-point format calculations are performed by a microprocessor, a high-performance processor becomes necessary compared to when fixed-point format calculations are performed, causing an increase in cost. In contrast, a configuration using a digital filter has a smaller circuit scale than that using a microprocessor so that the cost increase for a configuration corresponding to floating-point format is smaller than the case for a microprocessor. Furthermore, it becomes unnecessary to use a microprocessor or the like for the generation of the vibration compensating data DS and the power consumption at the circuit unit 4 can be reduced. Moreover, configuring the gyro filter 24 with the digital filter makes it possible to easily modify the adjustment data, such as filter coefficient. As a result, the setting of the adjustment data can be easily modified in accordance with the design of the image-capturing device.

Furthermore, in the embodiment, the processing for addition in the adder 32 of the Hall filter 22 is performed on the floating-point position data DP and the vibration compensating data DS.

When data of one side is in fixed-point format during addition at the adder 32, it is necessary to convert the output of the floating-point side (for example, output of the gyro filter 24) to fixed-point format. At this time, an upper limit must be set and a gain must be modified to correspond to the fixed-point side. These processes are complicated, and further replacing the upper limit creates a problem where accuracy also deteriorates. The embodiment does not have this problem since the inputs to the adder 32 are both floating-point data.

Although the input data format conversion circuit 40 outputs the position data DP and the angular velocity data Dω in time division in the embodiment, the Hall filter 22 and the gyro filter 24 are separate circuits. Thus, this can ensure sufficient calculation time at the Hall filter 22 and the gyro filter 24.

Figure 3:
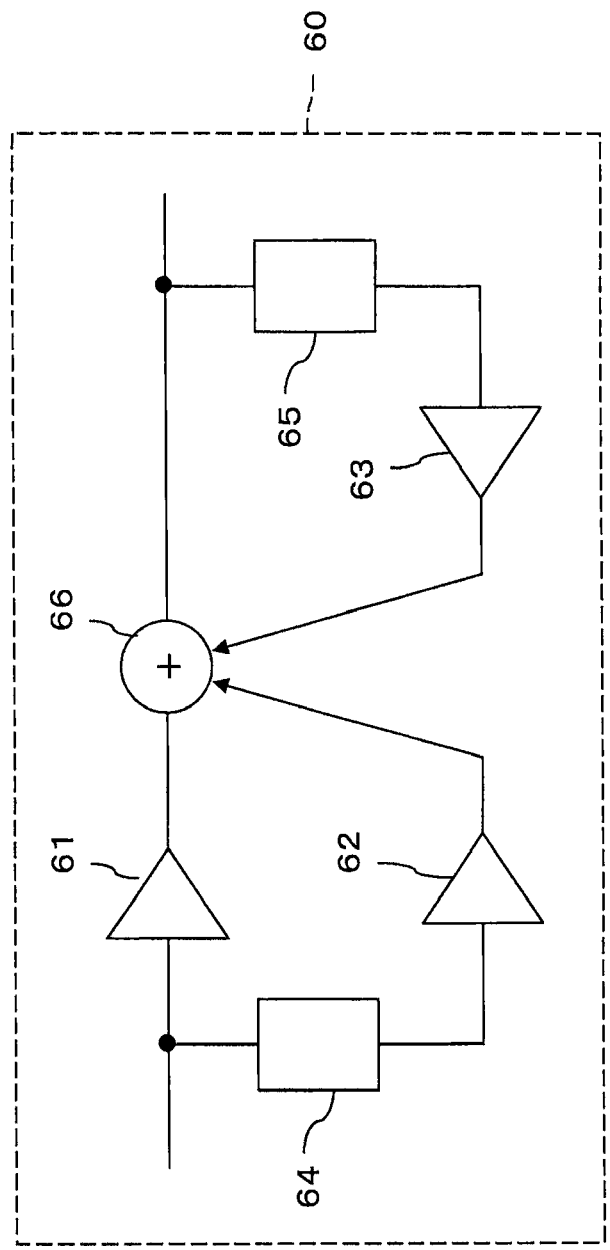
FIG. 3 is a schematic block diagram illustrating an example of a configuration of a digital filter used in the gyro filter.

FIG. 3 is a schematic block diagram showing an example of the configuration of the digital filter used in the gyro filter 24. A digital filter 60 is a first-order IIR filter composed of multipliers 61, 62, 63, delay circuits 64, 65, and an adder 66. The multiplier 61 multiplies the input data in floating-point format by a coefficient, such as one set in a register, and the multiplication result is input by the adder 66. The multiplier 62 multiplies the input data in floating-point format delayed by the delay circuit 64 by a coefficient, such as one set in a register, and the multiplication result is input by the adder 66. The multiplier 63 multiplies the input data in floating-point format delayed by the delay circuit 65 by a coefficient, such as one set in a register, and the multiplication result is input by the adder 66. The adder 66 adds the outputs of the adders 61 to 63 and outputs the result.

An upper limit and a lower limit can be set for the calculation range of the digital filter 60. Generally, in camera shake control, the absolute value of the data within the digital filter 60 does not reach the maximum numerical value that can be expressed in floating-point format. Furthermore, for example, when the calculation result at the integration circuit 44 reaches an extremely large numerical value, the time it takes to converge to a state where normal vibration compensating data can be obtained becomes long and the tracking performance of camera shake control decreases. Accordingly, when the absolute value of the calculated data exceeds a predetermined threshold value, the digital filter 60 of the present system replaces the calculated data with a predetermined upper limit value. Furthermore, when the absolute value of the calculated data becomes a small value that cannot be expressed, for example, by the DAC 26 or the like, the calculated data is replaced by 0. The threshold value and upper limit value used in these processes have been set in a register or the like.

For example, the replacement with the upper limit value or lower limit value is performed by the adder 66. The adder replaces the calculation result thereof with the upper limit value when the characteristic of the floating-point format data of the calculation result exceeds a predetermined threshold value and replaces the calculation result with 0 when the characteristic is less than a predetermined threshold value.

Although the embodiment was configured so that camera vibration detection, position detection of the lens 8, and driving of the lens 8 are performed by the gyro sensor 12, the Hall element 10, and the VCM 14, respectively, the present invention is not limited to this configuration. For example, a stepping motor or a piezoelectric element may be employed to drive the lens 8. When using a stepping motor, the Hall filter 22 uses the vibration compensating data DS to calculate the servo data DSV without the position data DP based on the Hall element 10. Furthermore, a configuration using a sensor for detecting linear acceleration can be adopted for vibration detection where vibration of the image-capturing device is detected on the basis of an acceleration signal.

Furthermore, although a lens shift system for performing camera shake compensation by driving the lens was adopted in the embodiment for the focus adjustment member, the present invention is also applicable to an image sensor shift system for shifting an image-capturing element, such as a CCD image sensor, as the focus adjustment member to correspond to shaking of the image-capturing device. In this case, a sensor detects the position of the image-capturing element and the image-capturing element is displaced by an actuator.

Figure 4:
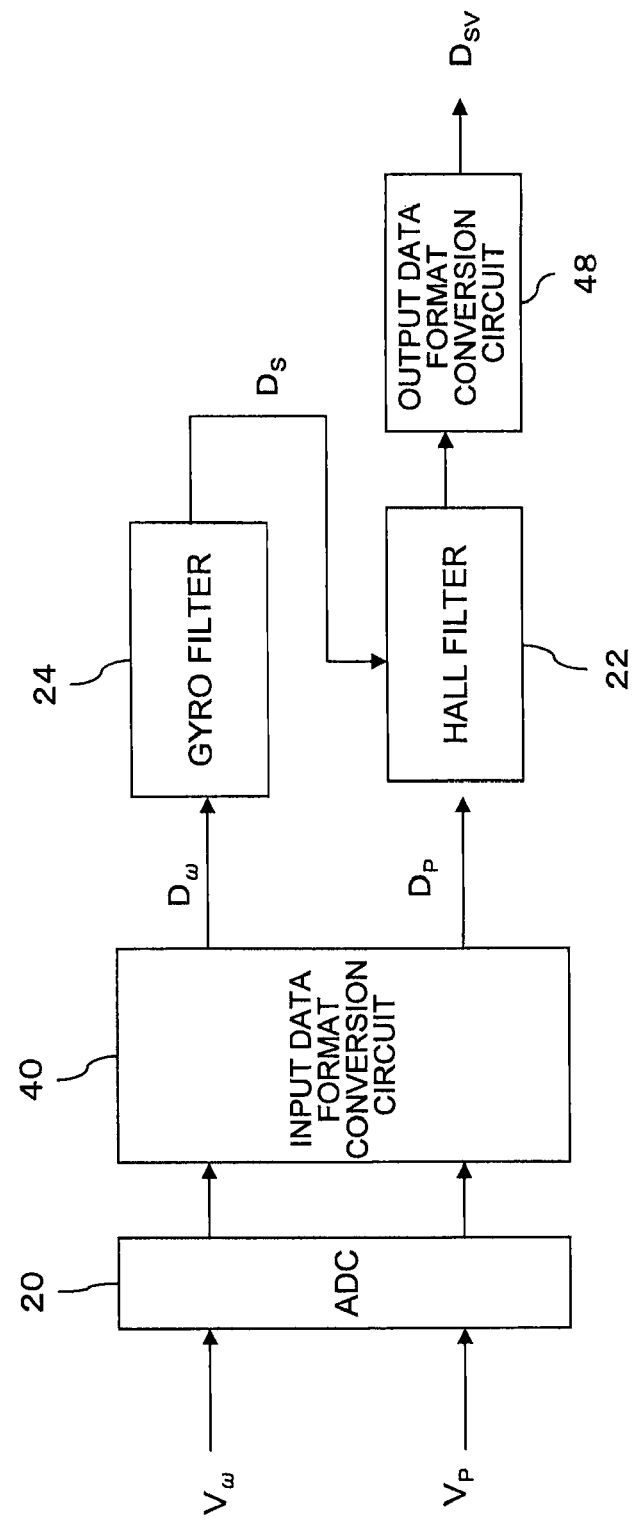
FIG. 4 is a schematic block diagram of the camera shake correction system relating to the embodiment.

FIG. 4 shows a conceptual configuration of the embodiment. The voltage signals VP and Vω from the Hall elements 10 and the gyro sensors 12 are subjected to A/D conversion at the ADC 20 and converted to fixed-point format digital data in time division. The obtained fixed-point format data are converted at the input data format conversion circuit 40 to floating-point format position data DP and angular data Dω in time division. The angular data Dω is input by the gyro filter 24 where floating-point format data calculation yields vibration compensating data DS, which is supplied to the Hall filter 22. At the Hall filter 22, servo data DSV is calculated in the x and y directions from the floating-point format position data DS and vibration compensating data DS and supplied to the output data format conversion circuit 48. The output data format conversion circuit 48 converts the floating-point format servo data DSV to fixed-point format servo data DSV.

The servo data DSV obtained in this manner representing the amount of movement in the x and y directions is converted to analog voltage at the DAC 26 and the current of the moving coil in the x and y directions of the VCM 14 is controlled so that the position of the lens 8 is compensated with respect to the detected vibration. In the case of PWM control, the servo data DSV is supplied to a PWM circuit, which controls the duty of the current amount to the x direction coil and y direction coil of the VCM 14.

Here, as described hereinabove, the Hall filter 22 and the gyro filter 24 perform calculations through data processing in floating-point format. Here, the digital filter shown in FIG. 3 is used for this processing. In this digital filter, it is necessary to set a coefficient for multiplication and a delay amount, the values of which are modified by the calculations. Therefore, these values are stored into memory and read from memory and rewritten as necessary.

Generally, the rewriting of these coefficients is performed by reading data from the respective memory in the Hall filter 22 and the gyro filter 24. However, in these processes, there may be instances where CPU processing in an external microprocessor is also performed.

Since the abovementioned floating-point format data is handled at the Hall filter 22 and the gyro filter 24, it is preferable to also store the floating-point format data in memory. However, when calculations in the CPU are performed in floating-point format, there is a problem where processing time increases compared to data calculations in fixed-point format.

Figure 5:
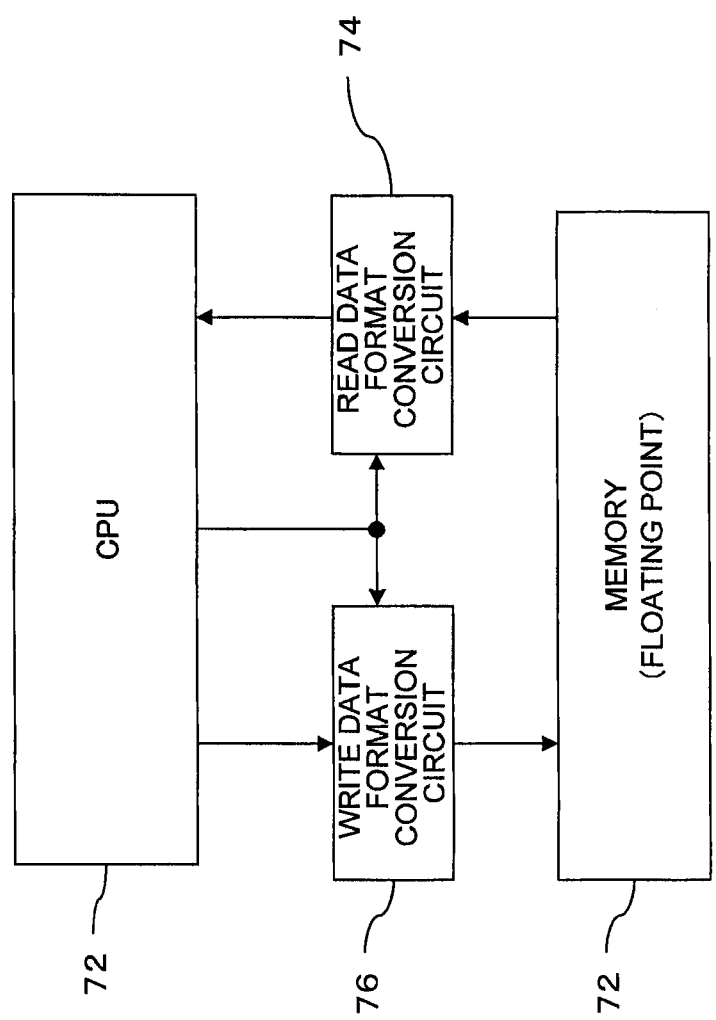
FIG. 5 shows a configuration for data access by a CPU.

Accordingly, data processing in fixed-point format is performed in the CPU with the configuration shown in FIG. 5.

Various types of data are stored in floating-point format in a memory 70 configured from SRAM. A CPU 72 reads out and processes data from within the memory 70 when necessary. At this time the data that is read passes a read data format conversion circuit 74 where it is converted to fixed-point data. Then, the CPU 72 passes the calculation result through a write data format conversion circuit 76, where it is converted to floating-point format, and then writes it to the memory 70.

At the time of the calculation, the CPU 72 can determine whether or not the calculation for fixed-point data was appropriately performed. Namely, if the calculation result is inspected, the decimal point position can be recognized as inappropriate in accordance with an occurrence of overflow in the calculation. Accordingly, in the embodiment, when the fixed-point position is inappropriate in the calculation result, the CPU 72 supplies to the read data format conversion circuit 74 a command for an appropriate fixed-point position and the fixed-point format to be set is modified in the read data format conversion circuit 74. Furthermore, when writing the calculation result for the read data to the memory 70, information regarding the fixed-point position for the data in the calculation in the CPU 72 is supplied to the write data format conversion circuit 76 and an appropriate conversion is performed on the basis of the specified fixed-point position in the write data format conversion circuit 76. It is preferable for the CPU 72 to issue a command to move up the fixed-point position by one if an overflow occurs in the largest value during calculation or in the result, and to move down the fixed-point position by one if both the MSB and the second bit are 0.

In this manner, an appropriate conversion is performed from floating-point format to fixed-point format with respect to a wide range of floating-point data to cancel accuracy issues in the CPU 72 and to perform high speed data processing in fixed-point format.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An image-capturing control device for calculating drive data for a focus adjustment member to compensate for movement of an image-capturing device on the basis of a displacement velocity of the image-capturing device detected by a displacement velocity detector and a position of the focus adjustment member of the image-capturing device detected by a position detector, the image-capturing control device comprising:

a first input data format converter for converting fixed-point format data regarding displacement velocity detected in said displacement velocity detector to displacement velocity data in floating-point format;

a displacement calculation circuit for calculating displacement data for a required amount said image-capturing device is to be displaced by data processing in floating-point format from displacement velocity data in floating-point format;

a second input data format converter for converting the position of the focus adjustment member detected by said position detector to position data in floating-point format;

a drive data generation circuit for generating drive data for said focus adjustment member by data processing in floating-point format of position data of said focus adjustment member in floating-point format and said displacement data in floating-point format; and an output data format conversion circuit for converting drive data in floating-point format to drive data in fixed-point format.

2. The control circuit for image-capturing device according to claim 1, wherein:

said first input data format conversion circuit and said second input data format conversion circuit are composed utilizing one data format conversion circuit in time division.

3. The control circuit for image-capturing device according to claim 2, wherein:

detection signals regarding analog displacement velocity and position are output from said displacement velocity detector and said position detector, the detection signals are converted from analog to digital in time division by an A/D converter to yield fixed-point format displacement velocity data and position data; and the obtained fixed-point format displacement velocity data and position data are sequentially supplied to said first input data format converter and said second input data format converter.

4. The control circuit for image-capturing device according to claim 1, wherein:

said displacement velocity detector is a gyro sensor.

5. The control circuit for image-capturing device according to claim 1, wherein:

said focus adjustment member is an optical lens; and said position detector is a Hall sensor for detecting a position of said optical lens.

6. The control circuit for image-capturing device according to claim 4, wherein:

said gyro sensor outputs an angular velocity $D\omega$;

said displacement calculation circuit integrates said angular velocity $D\omega$, calculates a data $D\theta$ regarding a vibration angle around the x axis and the y axis, and calculates on the basis of this a displacement data Ds, which is an amount the image-capturing device is to be displaced in the x axis and the y axis directions.

7. The control circuit for image-capturing device according to claim 6, wherein:

said drive data generation circuit adds displacement data Ds in the x axis and y axis directions to the position in said x axis and y axis directions detected by said position detection circuit, respectively, to calculate said drive data in the x axis and y axis directions.

* * * * *